(12) United States Patent
Baba et al.

(10) Patent No.: US 8,377,225 B2
(45) Date of Patent: Feb. 19, 2013

(54) SUBMERGED MEMBRANE SEPARATION APPARATUS, CLEANING METHOD FOR DIFFUSING APPARATUS, AND METHOD FOR MEMBRANE SEPARATION

(75) Inventors: Junichi Baba, Otsu (JP); Toshitsugu Onoe, Urayasu (JP); Makoto Ichinose, Otsu (JP)

(73) Assignee: Toray Industries, Inc., Tokyo (JP)

( * ) Notice: Subject to any disclaimer, the term of this patent is extended or adjusted under 35 U.S.C. 154(b) by 421 days.

(21) Appl. No.: 12/712,500

(22) Filed: Feb. 25, 2010

(65) Prior Publication Data

US 2010/0218789 A1 Sep. 2, 2010

(30) Foreign Application Priority Data

Feb. 27, 2009 (JP) ................................ 2009-045547

(51) Int. Cl.
*B08B 7/04* (2006.01)
(52) U.S. Cl. ....... 134/37; 134/42; 261/121.1; 261/121.4
(58) Field of Classification Search .................... 134/34, 134/37, 42, 22.12, 22.18; 210/170.6, 220, 210/354, 636; 216/121.1, 121.4, 122.1; 261/121.1, 261/121.4, 122.1
See application file for complete search history.

(56) References Cited

U.S. PATENT DOCUMENTS

2008/0210623 A1* 9/2008 McMahon et al. ............ 210/485

FOREIGN PATENT DOCUMENTS

| JP | 2002-166290 | | 6/2002 |
|----|-------------|---|--------|
| JP | 2005-138016 | * | 6/2005 |
| JP | 2006-116388 | | 5/2006 |
| JP | 2006-263716 | * | 10/2006 |
| WO | WO 2008/139836 A1 | | 11/2008 |

\* cited by examiner

*Primary Examiner* — Saeed T Chaudhry
(74) *Attorney, Agent, or Firm* — RatnerPrestia

(57) ABSTRACT

A membrane separation method is useful in purifying clear water, sewage, etc. and can reliably remove obstruction of an air diffusing apparatus by opening and closing valves, a submerged membrane separation apparatus to be used for the same, and a method for cleaning an air diffusing apparatus. The submerged membrane separation apparatus includes a separation membrane module, an air diffusing apparatus, and a gas supplying apparatus, wherein an air diffusing apparatus is arranged in one treatment tank, two header pipes (A and B) are placed as the gas supplying pipes, the connecting port a and the header pipe A and the connecting port b and the header pipe B for each of the air diffusing apparatuses are respectively connected, on-off valves are arranged in four parts, and the header pipes A and B each have an open end.

12 Claims, 5 Drawing Sheets

SUBMERGED MEMBRANE SEPARATION APPARATUS, CLEANING METHOD FOR DIFFUSING APPARATUS, AND METHOD FOR MEMBRANE SEPARATION

FIELD OF THE INVENTION

This application is a U.S. Application which claims priority to Japanese Patent Application No. 2009-045547, filed Feb. 27, 2009, the contents of this application being incorporated by reference herein in its entirety.

The present invention relates to a submerged membrane separation apparatus which may be suitably used for the treatment of clear water, sewage, nightsoil, industrial waste water, or the like, a method for cleaning an air diffusing apparatus to be used for the same, and a membrane separation method.

BACKGROUND OF THE INVENTION

A conventional example of a water treatment apparatus which filters clear water, sewage, nightsoil, industrial waste water, or the like through a membrane is shown in FIG. 4. As shown in FIG. 4, the submerged membrane separation apparatus has a separation membrane module 2 immersed in a treatment tank 1 in which a plurality of plate-like filtration membranes (membrane elements) are arranged in parallel and a treated water piping 3 that is communicated with the transmission side of the separation membrane module 2. Further, an air diffusing apparatus 4 is arranged below the separation membrane module 2 and a gas supplying apparatus 7 for supplying gas is provided via a gas supplying pipe 5. A suction pump 8 is used as a driving force of filtration. The liquid to be treated in the treatment tank is filtered through the separation membrane module 2. The filtrate is taken out of the treatment tank through the treated water piping 3.

Here, when filtration is operated, the stable filtration operation is performed in the manner that gas is supplied from the gas supplying apparatus 7 to the air diffusing apparatus 4 via the gas supplying pipe 5, gas is ejected from an air diffusing hole of the air diffusing apparatus 4 into the treatment tank 1, a gas-liquid mixing upflow caused by air lift action of the gas being ejected is made acted as traction on the membrane surface of the filtration membrane, the adhesion of a cake layer to the membrane surface is suppressed while the filtration is carried out.

In this case, a phenomenon that the liquid to be treated is flowed from the air diffusing hole during gas supply into the apparatus is often observed in the air diffusing apparatus 4. The air diffusing hole is clogged with solids which are formed when the liquid to be treated is dried by gas. As a result, the gas supply from the air diffusing apparatus is insufficient and a poor cleaning of the membrane surface is caused by insufficient traction.

Therefore, as a technique of preventing obstruction of the air diffusing hole, proposed is an apparatus in which an air diffusing apparatus has a structure formed only of a main pipe without a branched structure, gas supplying pipes are respectively connected to both ends of the main pipe of the air diffusing apparatus, and valves are placed on one or both of the gas supplying pipes (Patent document 1). However, in the air diffusing apparatus, a separating effect of solids which are once adhered to the air diffusing hole is not sufficiently obtained only by changing the gas flow direction by opening and closing of the valves, which results in difficulty in maintaining the performance of the air diffusing apparatus. This similarly occurs when a cleaning liquid is injected into the air diffusing apparatus and when a branched pipe that is openable and closable is provided.

Further, as another technique of preventing obstruction of the air diffusing hole, proposed is an apparatus in which an air diffusing apparatus is connected to a gas supplying apparatus via an air supply pipe, a pressure reduction means which reduces the internal pressure of the stem pipe to the level lower than the liquid pressure around the outside of the air diffusing apparatus is provided, the pressure in the stem pipe is reduced by operating the pressure reduction means when all of the gas supplying apparatuses are stopped, and a control unit that stops the process of reducing the pressure in the stem pipe by the pressure reduction means when at least any one of the gas supplying apparatuses is driven is provided (Patent document 2). However, in the air diffusing apparatus, solids separated from the air diffusing hole are again passed through the air diffusing hole and discharged to the outside. Thus, solids block the air diffusing hole again at the time of discharge. Further, the gas supplying apparatus tends to be larger in larger-scale treatment facilities. It is difficult to stop and re-drive the gas supplying apparatus frequently from the viewpoint of equipment operation management.

Further, as another technique of preventing obstruction of the air diffusing hole, proposed is an apparatus in which an air diffusing apparatus is communicated, at its base end side, with a gas supplying apparatus which is an air supply source, the tip side is communicated with an air diffusing drain pipe, the air diffusing drain pipe is open as an exhaust port in the upper position of the air diffusing apparatus, and a drain valve is provided (Patent document 3). However, the air diffusing apparatus supplies air from only one direction and thus solids blocking the inside can be discharged to only one direction. Therefore, even if solids adhered to the air diffusing hole can be removed, they can be remained and blocked again in the air diffusing drain pipe. In this case, the cleaning cannot be further performed.

Further, as another technique of preventing obstruction of the air diffusing hole, proposed is an apparatus in which an air diffusing apparatus is composed of a plurality of fine bubble diffusing pipes and a plurality of gas supplying pipes for supplying gas to the fine bubble diffusing pipes and the plurality of gas supplying pipes are arranged so as to be opposed across a vertically lower part of a separation membrane module (Patent document 4). However, the air diffusing apparatus does not have a mechanism for cleaning the inside of the apparatus, for example, a drain valve or a valve that changes the flow direction. Therefore, when solids are accumulated in the apparatus by any cause, the apparatus needs to be disassembled to remove them. This leads to a very complicated operation.

Prior Art Documents

Patent Documents

Patent document 1: Japanese Patent Application Laid-Open (JP-A) No. 2006-263716

Patent document 2: JP-A No. 2006-116388

Patent document 3: Japanese Patent No. 3382926

Patent document 4: PCT International Publication No. WO2008/139836

SUMMARY OF THE INVENTION

The present invention relates to reliably removing obstruction of the air diffusing apparatus with a simple operation of only opening and closing the valve.

Embodiments of the present invention include one or more of the following structures:

(1) an submerged membrane separation apparatus which includes a separation membrane module which is immersed and placed in a treatment tank in which a liquid to be treated is stored, an air diffusing apparatus which is disposed below the separation membrane module and has two connecting ports (a and b), and a gas supplying apparatus which supplies gas to the air diffusing apparatus through a gas supplying pipe, wherein when at least one air diffusing apparatus is arranged in one treatment tank, two header pipes (A and B) are placed as the gas supplying pipes, the connecting port a and the header pipe A as well as the connecting port b and the header pipe B for each of the air diffusing apparatuses are respectively connected, on-off valves are arranged in four parts: upstream sides (A1 and B1) of the connection point of the header pipes A and B and the first air diffusing apparatus and downstream sides (A2 and B2) of the connection point of the header pipes A and B and the last air diffusing apparatus one by one, and the end of the downstream sides of the header pipes A and B is open to the atmosphere;

(2) the submerged membrane separation apparatus according to (1), wherein the header pipes A and B are arranged at a height of 3 m or less above the water surface of the treatment tank;

(3) a method for cleaning an air diffusing apparatus, which includes a step of alternately providing a state (valve state 1) where the on-off valves A1 and B2 are opened and the on-off valves B1 and A2 are closed and a state (valve state 2) where the on-off valves A1 and B2 are closed and the on-off valves B1 and A2 are opened in a state where the filtration operation is stopped and the gas supplying apparatus is driven when the air diffusing apparatus in the submerged membrane separation apparatus according to either (1) or (2) is cleaned;

(4) the method for cleaning an air diffusing apparatus according to (3), which further includes a step of providing a state (valve state 3) where all of the on-off valves are opened;

(5) the method for cleaning an air diffusing apparatus according to (4), which further includes a step of providing the valve state 3 before and after the valve states 1 and 2 and during the switching of the valve states 1 and 2; and (6) a membrane separation method which includes a step of performing the membrane separation of the liquid to be treated while the method for cleaning an air diffusing apparatus according to any one of (3) to (5) is intermittently carried out.

According to an embodiment of the present invention, even though the apparatus has a simple structure which only includes at least one or more air diffusing apparatuses having two connecting ports, two header pipes, and four on-off valves, the liquid to be treated can be introduced into the air diffusing apparatus, the flow direction thereof can be changed and solids present in the air diffusing apparatus can be reliably discharged out of the apparatus without stopping the gas supplying apparatus when the air diffusing apparatus is cleaned. This allows the operation of the membrane separation apparatus to stably continue for a long period of time without causing obstruction of the air diffusing apparatus.

Further, when the header pipes are arranged at a height of 3 m or less above the water surface of the treatment tank, the liquid to be treated introduced into the air diffusing apparatus is easily discharged to the outside. Thus, the cleaning of the air diffusing apparatus can be more reliably performed.

Further, a state where all of the on-off valves are opened in a state where the gas supplying apparatus is driven is provided by operating the valves. As a result, the inside of the air diffusing apparatus is moistened with the liquid to be treated, solids are easily separated, and solids in the header pipes can be reliably blown and removed with air from the gas supplying apparatus.

DESCRIPTION OF THE SYMBOLS

Figure 1:
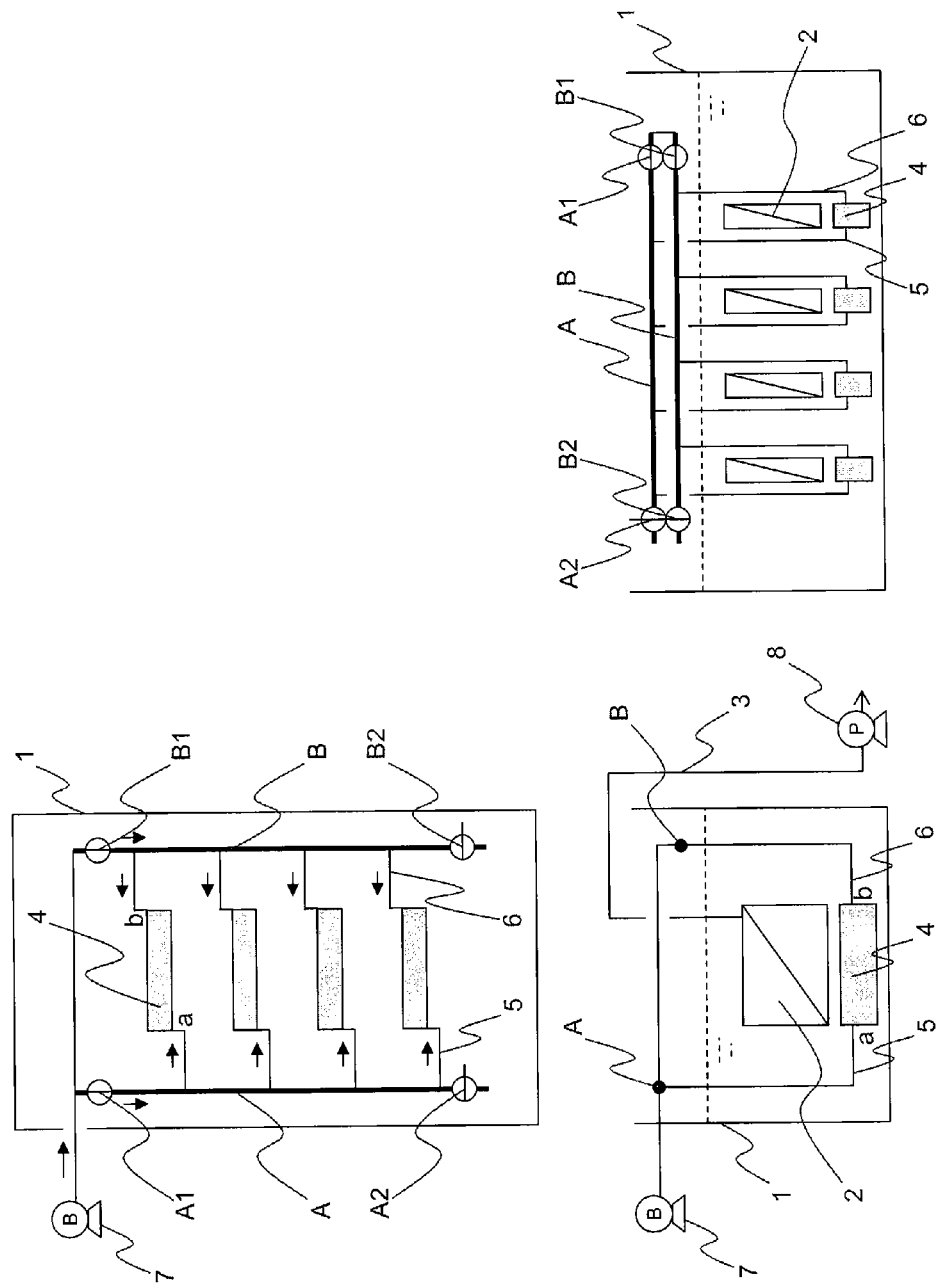
FIG. 1 is an outline flow chart showing the submerged membrane separation apparatus according to an embodiment of the present invention.

1: Treatment tank
2: Separation membrane module
3: Treated water piping
4: Air diffusing apparatus
5, 6: Gas supplying pipes
7: Gas supplying apparatus
8: Suction pump
9: Air diffusing hole
A, B: Header pipes
A1, A2, B1, B-2: On-off valves
a, b: Connecting ports of the air diffusing apparatus and the gas supplying pipe

DETAILED DESCRIPTION OF THE INVENTION

Hereinafter, the submerged membrane separation apparatus of the present invention will be described based on embodiments shown in FIGS. 1 and 2.

FIG. 1 is an outline flow chart showing the submerged membrane separation apparatus according to an embodiment of the present invention.

As shown in FIG. 1, the submerged membrane separation apparatus has a separation membrane module 2 immersed in a treatment tank 1, in which a plurality of plate-like filtration membranes (membrane elements) are arranged in parallel, and a treated water piping 3 that is communicated with the transmission side of the separation membrane module 2. Further, an air diffusing apparatus 4 having two connecting ports (a and b) is arranged below the separation membrane module 2. Gas supplying pipes 5 and 6 are respectively connected to the connecting ports a and b of the air diffusing apparatus 4. The gas supplying pipes 5 and 6 are respectively connected to header pipes A and B. In the header pipes A and B, on-off valves are arranged in four parts: upstream sides (A1 and B1) of the connection point of the first air diffusing apparatus and downstream sides (A2 and B2) of the connection point of the last air diffusing apparatus one by one. The end of the upstream sides is connected to a gas supplying apparatus 7 and the end of the downstream sides is open to the atmosphere. The treated water piping 3 is connected to a suction pump 8.

The number of the air diffusing apparatus that is connected to a pair of the header pipes A and B is not limited to the example of FIG. 1 and it may be one or more. However, when a lot of the air diffusing apparatuses are connected to the pair of the header pipes, the bore diameter of the header pipes becomes too large. This may be inconvenient from the viewpoint of placement and operation. Therefore, the number of the air diffusing apparatus is preferably 15 or less. Further, when the header pipes A and B are arranged at a height of 3 m or less above the water surface of the treatment tank, the liquid to be treated introduced into the air diffusing apparatus can be reliably discharged to the outside at the time of cleaning the air diffusing apparatus. Thus, it is more preferable.

There is particularly no problem even if the on-off valves A1, B1, A2, and B2 which are respectively provided on the header pipes A and B are on-off valves or selector valves as long as they can open and close to control the flow direction in these header pipes.

There is particularly no problem as long as the treatment tank 1 to be used in the present invention can store waste water and an activated sludge mixed liquid. A concrete tank, a fiber-reinforced plastic tank or the like is preferably used.

The separation membrane module 2 is formed so that a plurality of plate-like filtration membranes (membrane elements) are arranged in parallel. These membrane elements have, for example, a flat membrane element structure in which the filtration membranes are attached to both sides of a flame across a filtrate water channel material in order to improve handling properties and physical durability of the filtration membrane. The structure is not particularly limited and it may be an element formed of a hollow fiber membrane. When the flow rate in parallel with the membrane surface is applied to the flat membrane element structure, a removing effect of impurities due to shearing force is high. Therefore, the flat membrane element structure is suitably used in embodiments of the present invention. In this regard, a known separation membrane module disclosed in PCT International Publication No. WO2008/139836 can be used as the separation membrane module in embodiments of the present invention.

The air diffusing apparatus 4 has two connecting ports a and b and is arranged below the separation membrane module 2. For example, a known one disclosed in PCT International Publication No. WO2008/139836 can be used. In order to maximize the effects of the present invention, preferred is the air diffusing unit of the air diffusing apparatus, in which a lot of the air diffusing holes having a diameter of about 1 to 10 mm are provided on the lower side of the pipe.

The gas supplying apparatus 7 may supply gas to the air diffusing apparatus 4, and a blower, a compressor, a fan, a cylinder, or the like can be used.

There is particularly no problem as long as the suction pump 8 can allow the inside of the treated water piping 3 to be in a reduced pressure state. In place of the suction pump 8, the water head pressure difference due to a siphon effect can also be used.

Figure 2:
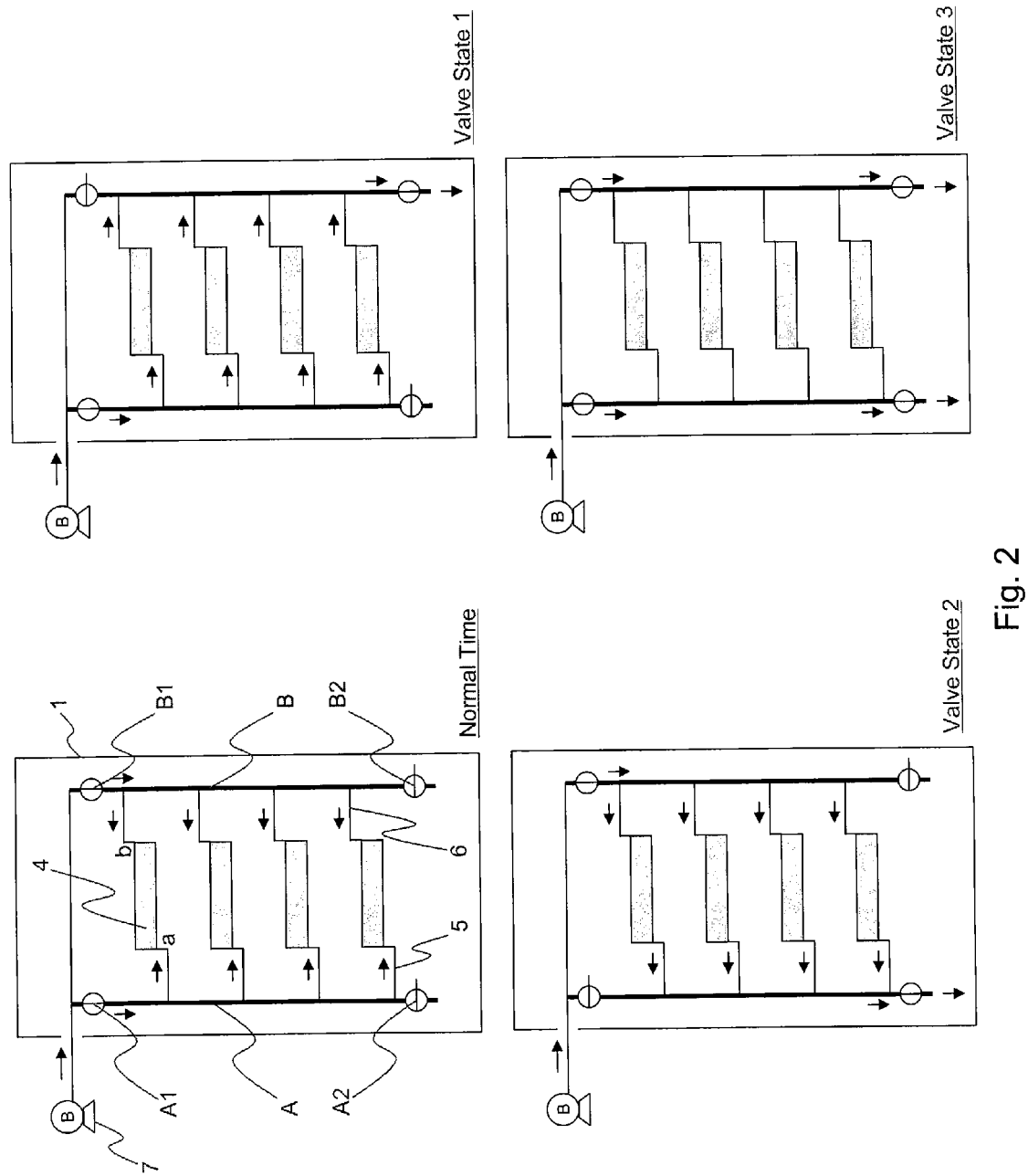
FIG. 2 is a schematic diagram showing the on-off state of valves and the flow direction in cleaning the air diffusing apparatus.

In the submerged membrane separation apparatus, the method for cleaning an air diffusing apparatus is performed in the manner as shown in FIG. 2. That is, the on-off valves A1 and B2 are opened and the on-off valves B1 and A2 are closed (the valve state 1) while the filtration operation is stopped and the gas supplying apparatus 7 is driven in a state (normal time) where air is diffused in the state where the on-off valves A1 and B1 are opened and the on-off valves A2 and B2 are closed. As a result, a flow in a direction from a to b is made in the air diffusing apparatus 4, solids present in the air diffusing apparatus 4 is extruded to the side of the header pipe B, and the solids are discharged from the on-off valve B2 to the outside. Then, the on-off valves A1 and B2 are closed and the on-off valves B1 and A2 are opened (the valve state 2). As a result, a flow in a direction from b to a which is opposite to the valve state 1 is made in the air diffusing apparatus 4, solids present in the air diffusing apparatus 4 are extruded to the side of the header pipe A, and the solids are discharged from the on-off valve A2 to the outside. A flow pressure in the opposite direction is alternately applied to solids present in the diffusing apparatus 4 by repeating these steps. Then, the solids are separated and crushed in the air diffusing apparatus 4, transported out of the air diffusing apparatus 4, and discharged. Thus, the air diffusing apparatus is cleaned. In this case, a pressure difference is formed in and out of the air diffusing apparatus in the vicinity of the air diffusing holes of the air diffusing apparatus. Therefore, the liquid to be treated is introduced into the air diffusing apparatus from the air diffusing holes. The separating and crushing effect of solids can be increased by a mixed flow of liquid and gas. The cycle and the number of repeating the valve states 1 and 2 at this time are not particularly limited. In order to increase the removing effect of solids, it is desirable to repeat the states in a period of 10 to 240 seconds 1 to 5 times. Further, even if either the valve state 1 or the valve state 2 is first performed, their effects are equal.

As described above, all of the air diffusing apparatuses connected to the header pipes can be cleaned by only operating a total of four valves placed in the pair of the header pipes. The effects of the present invention can be maximized in the case of a structure in which a plurality of air diffusing apparatuses are connected to the header pipes.

Further, gas from the gas supplying apparatus 7 is passed through the inside of the header pipes A and B and discharged from the on-off valves A2 and B2 by providing the state (the valve state 3) where all of the on-off valves are opened while the filtration operation is stopped and the gas supplying apparatus 7 is driven at the time of cleaning the air diffusing apparatus. Therefore, solids accumulated in the header pipes can be reliably discharged with gas from the gas supplying apparatus and the inside of the air diffusing apparatus 4 is filled with the liquid to be treated during that period. Therefore, solids adhered to the inside of the air diffusing apparatus are moistened and they are easily separated. Thus, it is preferable. The time and the number of repeating the valve state 3 are not particularly limited. In order to increase the removing effect of solids in the header pipes and the moistening effect of solids in the air diffusing apparatus, it is desirable to repeat it for 5 to 60 seconds 1 to 5 times.

Further, the valve state 3 is provided before and after the valve states 1 and 2 and during the switching of the valve states 1 and 2. As a result, solids remained in the header pipes A and B can be reliably discharged in the valve states 1 and 2, and in the valve state 3, solids adhered to the inside of the air diffusing apparatus 4 are moistened and they are easily separated. Therefore, in the case of subsequently providing the valve state 1 or 2, these solids are removed and the cleaning of the air diffusing apparatus is more reliably performed. Thus, it is particularly preferable.

In order to provide the valve state 3 before and after the valve states 1 and 2 and during the switching of the valve states 1 and 2 as described above, the operation is carried out so that all of the on-off valves A1, A2, B1, and B2 are first opened when respective valves are operated.

The term "liquid to be treated" means a mixed solution of aggregated microorganisms which take a role in the decomposition of liquids being treated, such as clear water, sewage, nightsoil, or industrial waste water, and pollutants in the liquids. When the liquid to be treated is dried, the aggregated microorganisms and inorganic components in the liquids are precipitated as solids. The formation of solids in an air diffusing pipe causes clogging.

EXAMPLES

Example 1

50 sheets of membrane elements (1,608 mm in length, 515 mm in width, and 1.4 m² in effective membrane area) in which composite flat membranes (0.08 μm in pore diameter and 200 μm in thickness) formed by coating polyester nonwoven fabrics with polyvinylidene fluoride membranes were pasted on both sides of a flame were arranged in parallel so that a void between adjacent membrane elements was 7 mm and the separation membrane module 2 was produced. The air diffusing apparatus 4 which was formed into a U shape as shown in FIG. 3 was placed in the lower part of the separation membrane module 2.

Figure 3:
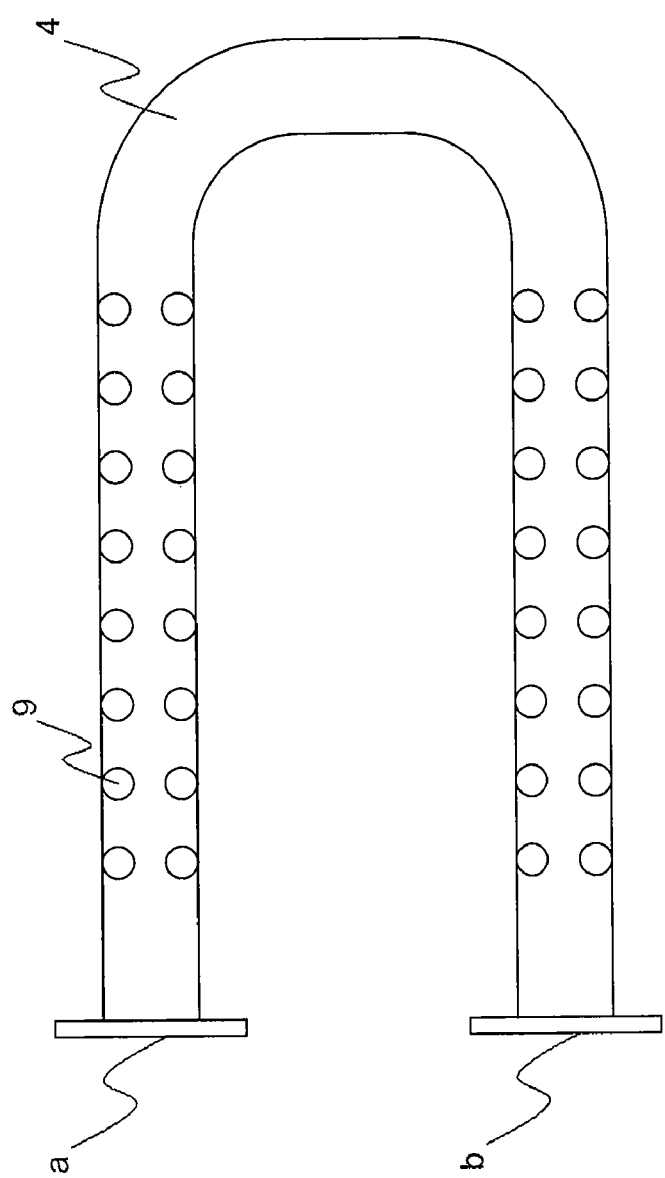
FIG. 3 is a schematic diagram showing the air diffusing apparatus used in Example 1.

The air diffusing apparatus 4 is produced by forming a stainless steel pipe having an outer diameter of 42.7 mmφ and a thickness of 3 mm into a U shape as shown in FIG. 3 and has the two connecting ports a and b. The center distance of U-shaped pipes having an air diffusing hole 9 formed in parallel with each other was 230 mm and the hole diameter of the air diffusing hole 9 was 6 mmφ. The air diffusing holes were provided at 2 parts for each pipe on one side so as to make 17 sets (68 parts in total). One set of air diffusing holes was provided at a part separated from each other in the circumferential direction of the pipes at a central angle of 40. The center distance (pitch of the air diffusing hole) of adjacent air diffusing hole sets was 42 mm. The air diffusing apparatus 4 was placed so that the air diffusing hole side was on the lower side. Four separation membrane modules 2 and four air diffusing apparatuses 4 were respectively placed in the treatment tank 1. A pair of header pipes A and B located at a height of 3 m above the water surface of the treatment tank was connected to the treated water piping 3 and the submerged membrane separation apparatus was produced.

The structure of the submerged membrane separation apparatus is shown in FIG. 1. The solid content concentration (MLSS) in the treatment tank 1 was 12,000 mg/L. The suction filtration was performed by intermittently operating the suction pump 8 at a suctioning/stopping interval of 9 minutes/1 minute at a membrane filtration flux (LV) of 0.6 m/d for six months and the filtrate was discharged out of the treatment tank. As for air diffusing conditions, the on-off valves A1 and B1 were usually opened, the on-off valves A2 and B2 were closed, and air was supplied from both sides of the air diffusing apparatus 4 under a condition of 2,000 L/min using the gas supplying apparatus 7.

At the time of cleaning the air diffusing apparatus, while the filtration operation was stopped and the gas supplying apparatus 7 was driven, the on-off valves A1 and B2 were first opened and the on-off valves B1 and A2 were closed with operating the valves (the valve state 1). The state was held for 60 seconds. Thereafter, the on-off valves A1 and B2 were closed and the on-off valves B1 and A2 were opened with operating the valves (the valve state 2). The state was held for 60 seconds. The method for cleaning an air diffusing apparatus including the steps of repeating the valve states 1 and 2 twice, then opening the on-off valves A1 and B1 and closing the on-off valves A2 and B2 again with operating the valves, and resuming the filtration operation under usual air diffusing conditions was carried out once a day.

In the present example, when all of the air diffusing holes of the air diffusing apparatus were confirmed six months later, obstruction of the air diffusing holes and the header pipes was not observed.

Example 2

The air diffusing apparatus was cleaned in the same manner as described in Example 1 except that the header pipes were placed at a height of 4 m above the water surface of the treatment tank. In the present example, when all of the air diffusing holes of the air diffusing apparatus were confirmed six months later, obstruction of the air diffusing holes was not observed. However, it was observed that solids were deposited in the header pipes.

Example 3

The air diffusing apparatus was cleaned in the same manner as described in Example 1 except that the steps of opening all of the on-off valves with operating the valves (the valve state 3) while the filtration operation was stopped and the gas supplying apparatus 7 was driven at a different time than the time of performing the method of Example 1 and holding the state for 20 seconds were performed once a day in addition to the method of Example 1. In the present example, when all of the air diffusing holes of the air diffusing apparatus were confirmed six months later, obstruction of the air diffusing holes and the header pipes was not observed.

Example 4

The air diffusing apparatus was cleaned in the same manner as described in Example 1 except that the valve state 3 was held for 20 seconds while the filtration operation was stopped and the gas supplying apparatus 7 was driven immediately before the valve states 1 and 2 in the method of Example 1 and immediately before resuming the filtration operation in addition to the method of Example 1. In the present example, when all of the air diffusing holes of the air diffusing apparatus were confirmed six months later, obstruction of the air diffusing holes and the header pipes was not observed.

Comparative Example 1

Figure 5:
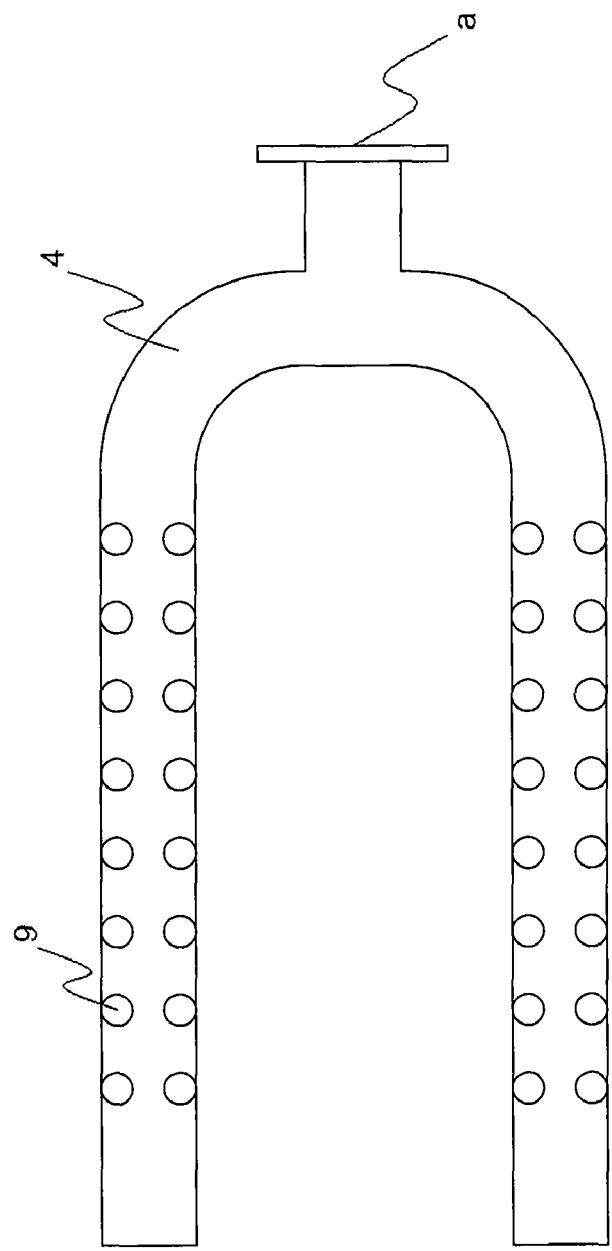
FIG. 5 is a schematic diagram showing the air diffusing apparatus used in Comparative example 1.

The same separation membrane module 2 as that of Example 1 was used and the air diffusing apparatus 4 which was formed into a Y shape as shown in FIG. 5 was placed in the lower part of the separation membrane module 2.

The air diffusing apparatus 4 is produced by forming a stainless steel pipe having an outer diameter of 42.7 mmφ and a thickness of 3 mm into a Y shape as shown in FIG. 5 and has the one connecting port a. The center distance of Y-shaped pipes having an air diffusing hole 9 formed in parallel with each other was 230 mm and the hole diameter of the air diffusing hole 9 was 6 mmφ. The air diffusing holes were provided at 2 parts for each pipe on one side so as to make 17 sets (68 parts in total). One set of air diffusing holes was provided at a part separated from each other in the circumferential direction of the pipes at a central angle of 40. The center distance (pitch of the air diffusing hole) of adjacent air diffusing hole sets was 42 mm. The air diffusing apparatus 4 was placed so that the air diffusing hole side was on the lower side. Four separation membrane modules 2 and four air diffusing apparatuses 4 were respectively placed in the treatment tank 1. The gas supplying apparatus 7 was connected to the treated water piping 3 and the submerged membrane separation apparatus was produced.

Figure 4:
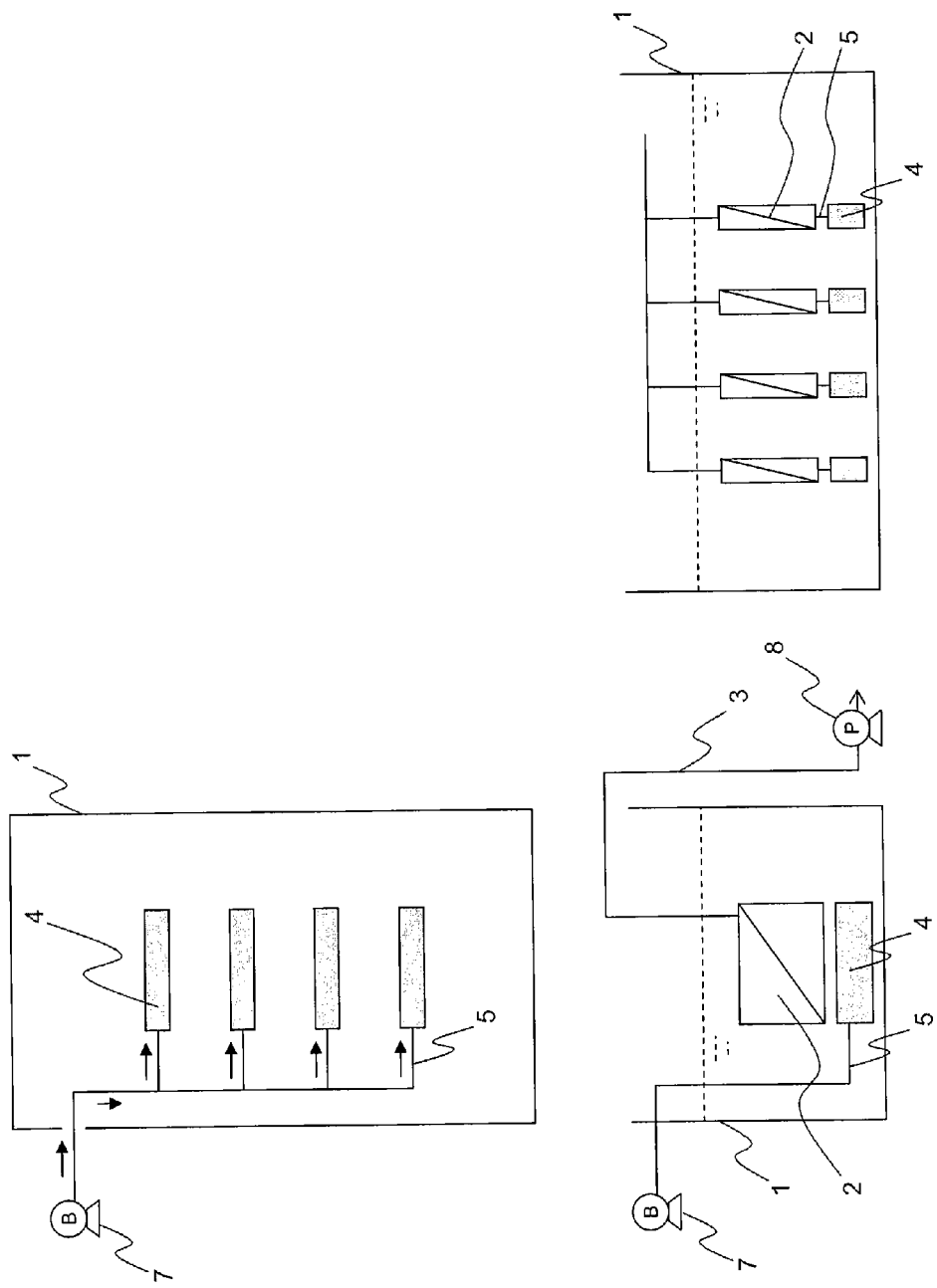
FIG. 4 is an outline flow chart showing a conventional submerged membrane separation apparatus.

The structure of the submerged membrane separation apparatus is shown in FIG. 4. The solid content concentration (MLSS) in the treatment tank 1 was 12,000 mg/L. The suction filtration was performed by intermittently operating the suction pump 8 at a suctioning/stopping interval of 9 minutes/1 minute at a membrane filtration flux (LV) of 0.6 m/d for six months and the filtrate was discharged out of the treatment tank. As for air diffusing conditions, air was supplied from the air diffusing apparatus 4 under a condition of 2,000 L/min using the gas supplying apparatus 7. In the present example, when all of the air diffusing holes of the air diffusing apparatus were confirmed six months later, in three air diffusing apparatuses, obstruction was respectively observed in 5 parts, 8 parts, and 15 parts (28 parts in total) of air diffusing holes.

Embodiments of the present invention may be suitably used for the membrane separation method which purifies clear water, sewage, nightsoil, industrial waste water, or the like, the submerged membrane separation apparatus to be used for the same, and further the method for cleaning an air diffusing apparatus to be used for the same.

The invention claimed is:

1. A method for cleaning an air diffusing apparatus of a submerged membrane separation apparatus comprising:
   a separation membrane module which is placed in a treatment tank in which a liquid to be treated is to be stored;
   at least one air diffusing apparatus which is disposed below the separation membrane module and has a first connecting port a and a second connecting port b; and
   a gas supplying apparatus which supplies gas to the air diffusing apparatus through a as supplying pipe;
   wherein when at least one air diffusing apparatus is arranged in one treatment tank, a first header pipe A and a second header pipe B are placed as the gas supplying pipes, the first connecting port a and the first header pipe A and the second connecting port b and the second header pipe B for each air diffusing apparatus are respectively connected, on-off valves are arranged in four parts: a first upstream side A1 and a second upstream side B1 of the connection point of the first and second header pipes A and B and the first air diffusing apparatus and a first downstream side A2 and a second downstream side B2 of the connection point of the first and second header pipes A and B and the last air diffusing apparatus one by one, and
   the downstream ends of the first and second header pipes A and B being open to the atmosphere;
   the method comprising:
   alternately providing a valve state 1 where on-off valves A1 and B2 are opened and on-off valves B1 and A2 are closed and a valve state 2 where the on-off valves A1 and B2 are closed and the on-off valves B1 and A2 are opened in a state where the filtration operation is stopped and the gas supplying apparatus is driven when the air diffusing apparatus in the submerged membrane separation apparatus is cleaned;
   further comprising providing a valve state 3 where all of the on-off valves are opened.

2. The method for cleaning an air diffusing apparatus according to claim 1, further comprising providing the valve state 3 before and after the valve states 1 and 2 and during the switching of the valve states 1 and 2.

3. A membrane separation method comprising: performing the membrane separation of the liquid to be treated while the method for cleaning an air diffusing apparatus according to claim 2 is intermittently carried out.

4. A membrane separation method comprising: filtering a liquid with a membrane element and intermittently cleaning an air diffusing apparatus according to the method of claim 1, wherein the membrane element is arranged in the separation membrane module.

5. A method for cleaning at least one air diffusing apparatus of a submerged membrane separation apparatus, comprising:
   (i) stopping filtration of a liquid to be treated with the submerged membrane separation apparatus, the submerged membrane separation apparatus comprising:
   a separation membrane module which is placed in a treatment tank in which the liquid to be treated is to be stored,
   the at least one air diffusing apparatus being disposed in the treatment tank below the separation membrane module, the at least one air diffusing apparatus comprising a first
   connecting port connected to a first header pipe and a second connecting port connected to a second header pipe,
   a gas supplying apparatus which supplies gas to the air diffusing apparatus through a gas supplying pipe, and
   a first, second, third, and fourth on-off valve,
   wherein the first header pipe is connected to the gas supplying pipe at a first connection point and the second header pipe is connected to the gas supplying pipe at a second connection point,
   the first on-off valve is located between the first connection point and first connecting port, the second on-off valve is located between the second connection point and the second connecting port, the third on-off valve is located on the first header pipe downstream of the first connecting port, and the fourth on-off valve is located on the second header pipe downstream of the second connecting port, and
   each of the first and second header pipes have an open end, the open end of the first header pipe being downstream of the third on-off valve and the open end of the second header pipe being downstream of the fourth on-off valve;
   (ii) supplying gas to the air diffusing apparatus; and
   (iii) providing a first valve state, the first valve state comprises opening all of the on-off valves.

6. The method of claim 5 further comprising providing at least one of a second valve state and a third valve state,
   wherein the second valve state comprises opening the first and fourth on-off valves and closing the second and third on-off valves, and
   the third valve state comprises closing the first and fourth on-off valves and opening the second and third on-off valves.

7. The method of claim 6 wherein the first, second, and third valve states are provided alternately.

8. A membrane separation method comprising:
   (i) filtering a liquid to be treated through a membrane element; and
   (ii) intermittently cleaning at least one air diffusing apparatus of a submerged membrane separation apparatus according to the method of claim 7,
   wherein the membrane element is arranged in the separation membrane module.

9. A membrane separation method comprising:
   (i) filtering a liquid to be treated through a membrane element; and
   (ii) intermittently cleaning at least one air diffusing apparatus of a submerged membrane separation apparatus according to the method of claim 6,
   wherein the membrane element is arranged in the separation membrane module.

10. The method of claim 5, wherein the first and second header pipes of the submerged membrane separation apparatus are arranged at a height of 3 m or less above the water surface of the treatment tank.

11. A membrane separation method comprising:
   (i) filtering a liquid to be treated through a membrane element; and (ii) intermittently cleaning at least one air diffusing apparatus of a submerged membrane separation apparatus according to the method of claim 10,
wherein the membrane element is arranged in the separation membrane module.

12. A membrane separation method comprising:
(i) filtering a liquid to be treated through a membrane element; and
(ii) intermittently cleaning at least one air diffusing apparatus of a submerged membrane separation apparatus according to the method of claim 5,
wherein the membrane element is arranged in the separation membrane module.

\* \* \* \* \*